June 19, 1934.  J. R. LASSITER, JR., ET AL  1,963,625
REFRIGERATING APPARATUS
Filed June 10, 1933  3 Sheets-Sheet 1
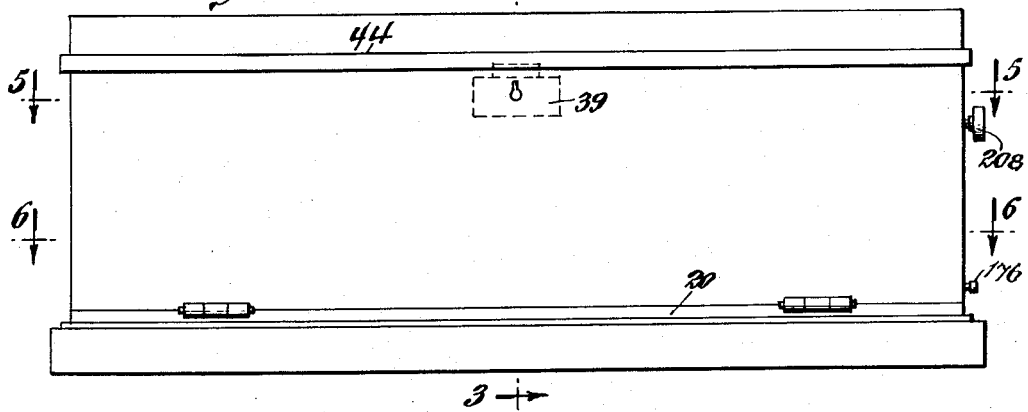
Fig. 1
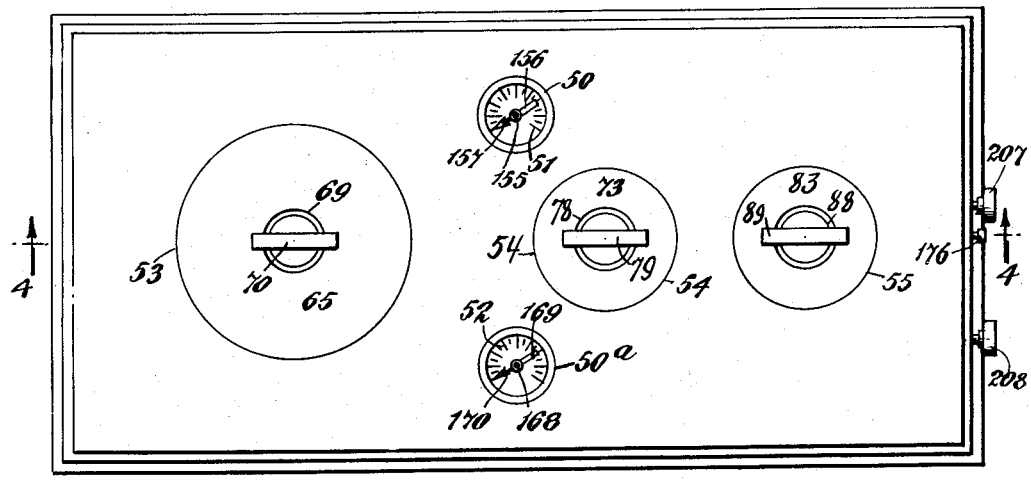
Fig. 2
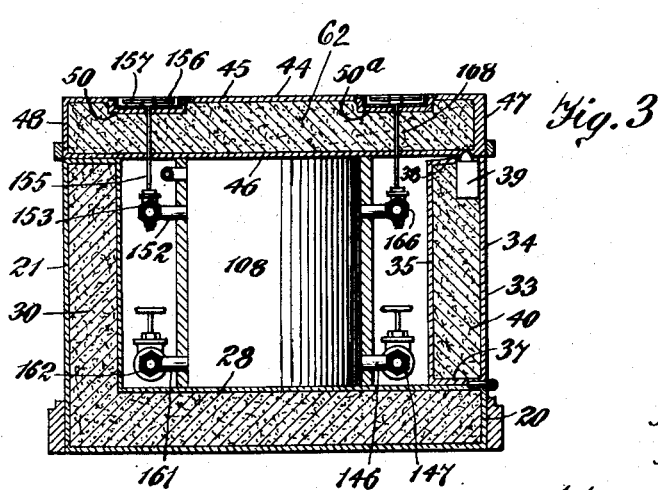
Fig. 3
Fig. 7
INVENTOR
JOHN R. LASSITER JR.
CLARA E. QUINN
JOHN G. LAPHAM
By A. A. de Bonneville ATTORNEY

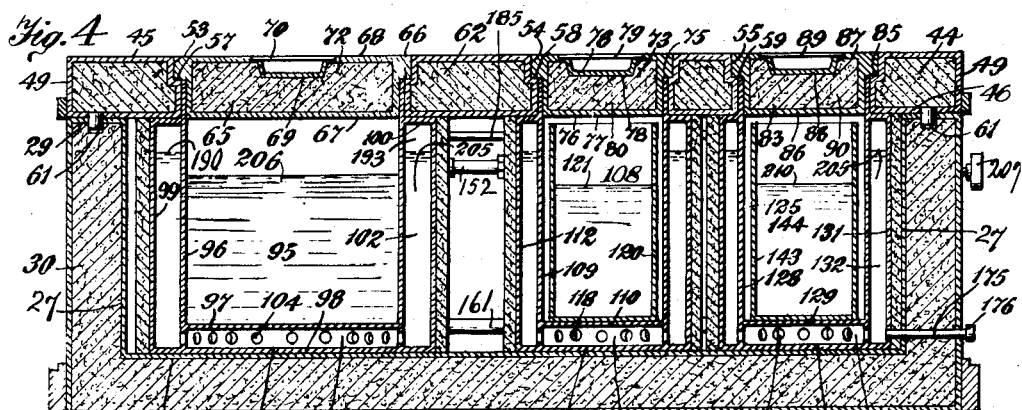
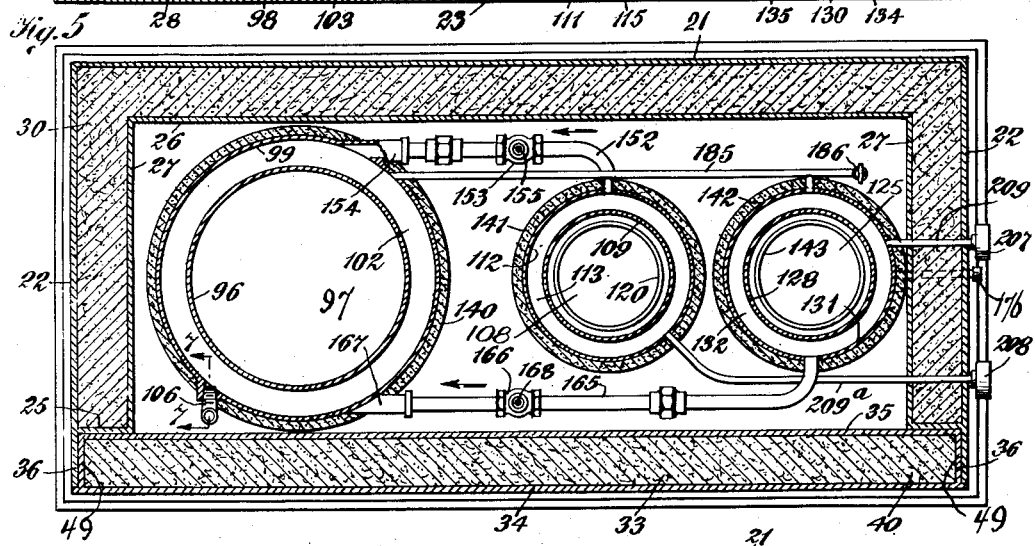
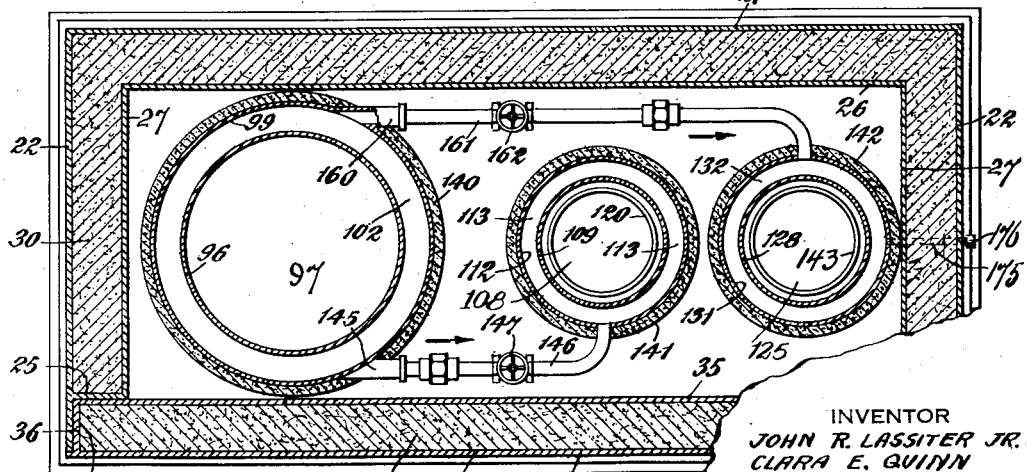

June 19, 1934.    J. R. LASSITER, JR., ET AL    1,963,625
REFRIGERATING APPARATUS
Filed June 10, 1933    3 Sheets-Sheet 3
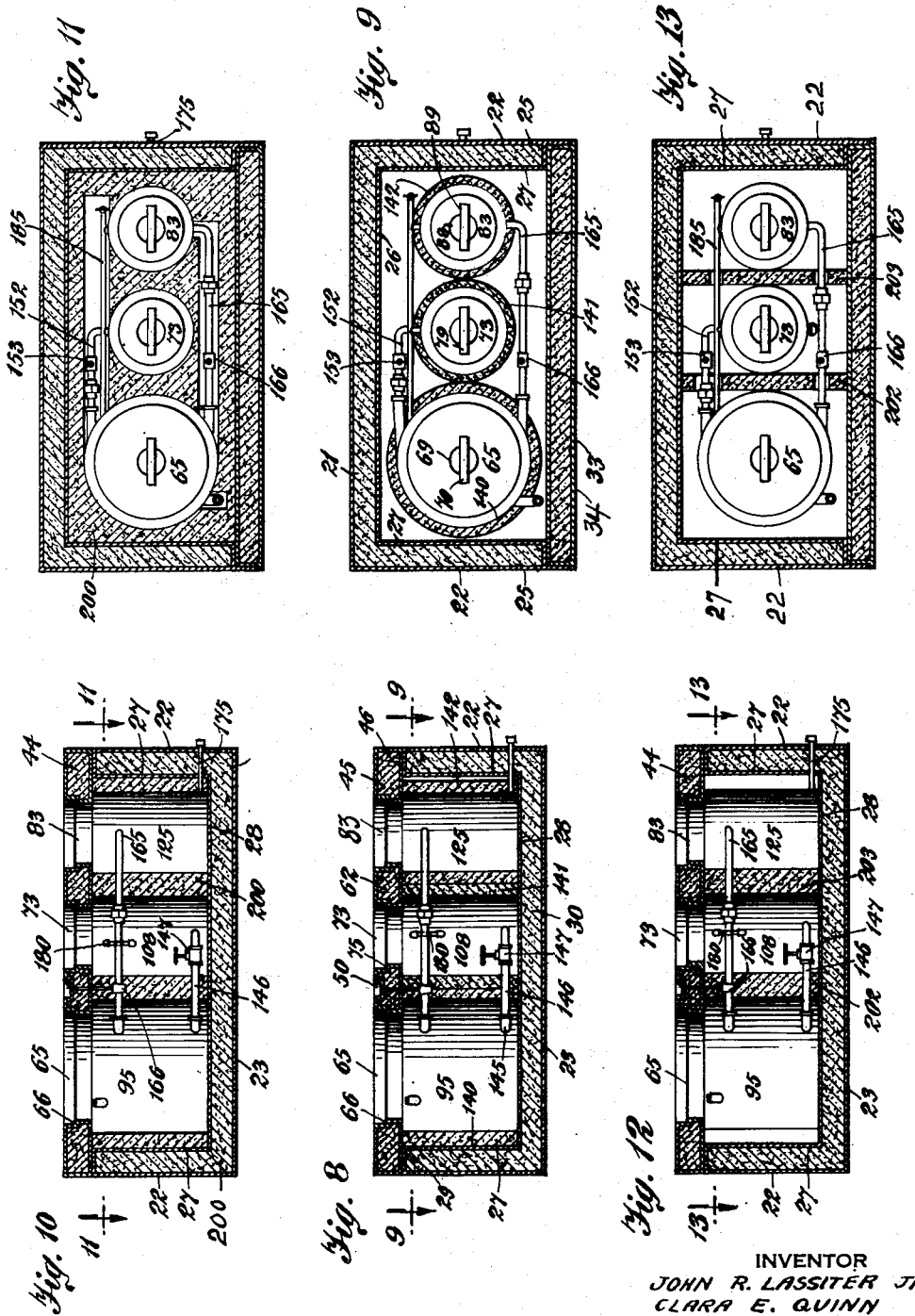
INVENTOR
JOHN R. LASSITER JR.
CLARA E. QUINN
JOHN G. LAPHAM
By A. A. de Bonneville ATTORNEY Patented June 19, 1934

1,963,625

UNITED STATES PATENT OFFICE 1,963,625

REFRIGERATING APPARATUS

John R. Lassiter, Jr., New York, and Clara E. Quinn, Hastings upon Hudson, N. Y., and John G. Lapham, Jersey City, N. J., assignors to Driice Appliances Incorporated, New York, N. Y., a corporation of Delaware Application June 10, 1933, Serial No. 675,158

5 Claims. (Cl. 62—101)

This invention relates to refrigerating apparatus.

The object of the invention is the production of refrigerating apparatus, adapted to automatically lower or maintain various materials at predetermined low and variable temperatures.

The second object of the invention is the production of refrigerating apparatus in which a volatile circulating fluid, cooled by a freezing agent, maintains a material operated upon at a low temperature or lowers its temperature.

The third object of the invention is the production of refrigerating apparatus, in which a fluid is circulated thermosyphonically, resulting from coacting with a cooling agent and an object operated upon having a higher temperature.

The organization of the invention is exemplified in this instance with a cold storage tank, for a cooling agent and a plurality of cooling containers for the objects or material operated upon, and a volatile circulating fluid flowing from said storage tank to said cooling containers and then returning to said cold storage tank. The flow of the fluid is continuously repeated. The circulating fluid is cooled by the cooling agent and the temperature of the objects operated upon is thereby maintained at a low temperature or its temperature is lowered.

In the accompanying drawings Fig. 1 represents a front elevation of a cabinet having an exemplification of the refrigerating apparatus therein; Fig. 2 shows a top view of Fig. 1; Fig. 3 indicates a section on the line 3, 3 of Fig. 1; Fig. 4 is a section on the line 4, 4 of Fig. 2; Fig. 5 represents a section of Fig. 1 on the line 5, 5; Fig. 6 indicates a section on the line 6, 6 of Fig. 1; Fig. 7 is a sectiton on the line 7, 7 of Fig. 5; Fig. 8 shows a partial section of Fig. 2 similar to Fig. 4 on a reduced scale; Fig. 9 represents a partial section on the line 9, 9 of Fig. 8; Fig. 10 shows a section similar to Fig. 8 with a modification; Fig. 11 shows a section of Fig. 10 on the line 11, 11; Fig. 12 shows a section similar to Fig. 10, with a further modification and Fig. 13 indicates a section of Fig. 12 on the line 13, 13.

Referring to Figs. 1 to 9 inclusive the refrigerating apparatus is exemplified in this instance with a cabinet having a body portion comprising the front wall 20, the outer rear wall 21, the outer side walls 22, the outer bottom wall 23, the inner front wall 25, the inner rear wall 26, the inner side walls 27, the inner bottom wall 28, and the top wall 29. The walls of the body portion of the cabinet have interposed between them the heat insulating material 30, in this instance preferably of cork. To the wall 20 is hinged the door 33, which comprises the front wall 34, the rear wall 35, the side walls 36, the bottom wall 37, and the top wall 38. To the front wall 34 is attached the lock 39. Between the walls of the door is interposed a heat insulating material 40 similar to 30.

The cabinet has provided therefor a main detachable cover designated in its entirety by the numeral 44. The detachable cover comprises the outer top wall 45, the bottom wall 46, the front wall 47, the rear wall 48, and the side walls 49.

The top wall 45 has formed therein the similar depressions 50 and 50a, in which are respectively fastened the dial plates 51 and 52.

The cover 44 has formed therein the cylindrical openings 53, 54 and 55. The walls of the openings 53, 54 and 55 are respectively indicated with the shoulders 57, 58 and 59. Pins 61 extend from the bottom wall 46 of the cover 44 and engage openings in the top wall 29 of the body portion of the cabinet. The walls of the main cover 44 have interposed between them heat insulating material 62 similar to 30. A supplemental cylindrical cover 65 is detachably positioned in the opening 53 of the main cover. The cover 65 comprises a cylindrical wall with the shoulder 66, the bottom wall 67 and the top wall 68 with the depressed portion 69. A handle 70 is fastened to the wall 68. Heat insulating material 72 is contained between the walls of the cover 65. The shoulder 66 of the cover 65 bears on the shoulder 57. A second cylindrical supplemental cover 73 is detachably positioned in the cylindrical opening 54. The cover 73 comprises the cylindrical wall having the shoulder 75, the bottom wall 76 and the top wall 77 with the depressed portion 78. A handle 79 is fastened to the wall 77 over said depressed portion 78. Heat insulating material 80 is contained between the walls of the cover 73.

A third cylindrical supplemental cover 83 is detachably positioned in the opening 55. The cover 83 comprises the cylindrical wall having the shoulder 85, the bottom wall 86 and the top wall 87 with the depressed portion 88. A handle 89 is fastened to the wall 87 over said depressed portion 88. Heat insulating material 90 is contained between the walls of the cover.

A cold storage tank is indicated in its entirety by the numeral 95, and comprises the inner cylindrical wall 96, the inner bottom wall 97, the outer bottom wall 98, the outer cylindrical wall 99 and the top wall 100. The walls 96 and 99 form between them the annular jacket 102, and the walls 97 and 98 form between them the lower jacket 103. Openings 104 are indicated in the wall 96 below the wall 97 to connect the jackets 102 and 103. It will be noted that the upper portion of the wall 96 extends between the cylindrical wall of the opening 53 and the cylindrical wall of the cover 65. A charging fitting 106 having the screw plug 107 is in threaded engagement with an opening in the wall 99 of the tank 95.

A cooling container is indicated in its entirety by the numeral 108, and comprises the inner cylindrical wall 109, the inner bottom wall 110, the outer bottom wall 111 and the outer cylindrical wall 112. The walls 109 and 112 form between them the annular jacket 113, and the walls 110 and 111 form between them the lower jacket 115. Openings 118 are indicated in the wall 112 below the wall 110, to connect the jackets 113 and 115. It will be noted that the upper portion of the wall 109 extends between the cylindrical wall of the opening 54 and the cylindrical wall of the cover 73.

A can 120 for ice cream 121 or other material to be cooled or frozen is preferably placed in the cooling container 108.

A second cooling container is indicated in its entirety by the numeral 125 and comprises the inner cylindrical wall 128, the inner bottom wall 129, the outer bottom wall 130 and the outer cylindrical wall 131. The walls 128 and 131 form between them the annular jacket 132, and the walls 129 and 130 form between them the lower jacket 134. Openings 135 are indicated in the cylindrical wall 128 below the wall 129 to connect the jackets 132 and 134. It will be noted that the upper portion of the wall 128 extends between the cylindrical wall of the opening 55 and the cylindrical wall of the cover 83. A cylindrical jacket 140 of heat insulating material, preferably cork surrounds the outer cylindrical wall 99 of the cold storage tank 95, and cylindrical jackets 141 and 142 of heat insulating material also preferably of cork respectively surround the outer cylindrical walls 112 and 131 of the cold storage tanks. A can 143 similar to 120 is preferably placed in the cooling container 125 for a material 144 to be operated upon.

An outlet fitting 145 extends from the lower portion of the wall 99 of the cold storage tank 95, and has connected thereto the piping 146 with the controlling valve 147. The piping 146 leads to and is connected to the lower portion of the wall 112 of the first cooling container 108, see Fig. 6. Spaced from the upper portion of the wall 112 of the first cooling container 108 is indicated the return piping 152 with the controlling valve 153. The piping 152 leads to and connects with the fitting 154 extending from the wall 99 of the cold storage tank 95. The valve stem 155 of the controlling valve 153 extends through an opening in the depression 50 and its dial plate 51, and has connected thereto the controlling handle 156 having the pointer 157.

A fitting 160 opposite to the fitting 145 extends from the lower portion of the wall 99 of the cold storage tank 95 and has connected thereto the piping 161, with the controlling valve 162. The piping 161 leads to and is connected to the lower portion of the wall 131 of the second cooling container 125, see Fig. 6. Spaced from the upper portion of the wall 131 of the second cooling container 125 is indicated the return piping 165, which extends from the wall 131 and has connected thereto the controlling valve 166. The piping 165 leads to the fitting 167 extending from the wall 99 of the cold storage tank 95. The valve stem 168 of the controlling valve 166 extends through an opening in the second depression 50a and its dial plate 52, and has connected thereto the controlling handle 169 with the pointer 170. A drain pipe 175 having the cap 176 extends from the lower portion of the wall 131 of the second cooling tank 125.

A sight glass 180 (see Figs. 10 and 12) is connected to the wall 112 of the cooling container 108. Equalizer piping 185 is connected to the walls 99, 112 and 131. The piping 185 has connected thereto at one end the petcock 186.

It will be noted that the return piping 152 and 165 is in a plane below the top walls of the cold storage tank 95 and below the top walls of the cooling containers 108 and 125. The top level of the circulating fluid is maintained on a level indicated by the line 190, and thereby expansion chambers 193 are provided at the upper portions of all the jackets.

The equalizer piping 185 connecting the expansion chambers at the upper portions of the jackets 102, 113 and 132 maintains equal slight pressure in all of said expansion chambers. By this means the top level of the circulating fluid 205 in the apparatus is maintained at the same level in all the said jackets, 102, 113 and 132, which produces a uniform circulation of said fluid. The petcock 186 in the piping 185 is opened when the apparatus is charged with its circulating fluid. The cooling effects produced on the materials in the cans 120 and 143 may be varied, by varying the quantity of the circulating fluid flowing through the jackets 102, 113 and 132 by means of the controlling valves 153 and 166. The expansion chambers 193 at the upper ends of the jackets of the tank 95 and the containers 108 and 125, permits the ebulition of the circulating fluid, required for its circulation. By regulating the quantity of the circulating fluid 205 in the jackets 102, 113 and 132 the temperatures of the materials operated upon can be varied. Thermometers 207 and 208 are respectively connected to the chambers 132 and 112 by the piping 209 and 209a.

Referring to Figs. 10 and 11 which indicate a slight modification of the invention, the body portion of the cabinet is again indicated having the outer side walls 22, the bottom wall 23, the inner side walls 27 and the inner bottom wall 28. The main detachable cover is again indicated at 44, with its supplemental covers 65, 73 and 83. The cold storage tank is again shown at 95, and the cooling containers are again indicated at 108 and 125. The piping 146 is shown with its valve 147. The return piping 152 is again indicated with its controlling valve 153. The return piping 165 is again indicated with its controlling valve 166. The sight glass is indicated at 180 and the drain pipe is shown at 175. The equalizer piping is shown at 185. In this modification in place of the cylindrical jackets 140, 141, and 142 of heat insulating material, the body portion of the cabinet is filled with the heat insulating material 200 preferably of cork, positioned between the inner walls of the cabinet and the outer walls of the cold storage tank 95 and the containers 108 and 125.

Referring to Figs. 12 and 13 which show a further slight modification of the invention, the body portion of the cabinet is again indicated having the outer side walls 22; the bottom wall 23, the inner side walls 27 and the inner bottom wall 28. The main detachable cover is again indicated at 44, with its supplemental covers 65, 73 and 83. The cold storage tank is again shown at 95 and the cooling containers are again indicated at 108 and 125. The piping 146 is shown with its valve 147. The return piping 152 is again indicated with its controlling valve 153. The return piping 165 is again shown with its controlling valve 166. The sight glass is indicated at 180, and the drain pipe is also indicated at 175. The equalizer piping is shown at 185. In this modification in place of the cylindrical jackets 140, 141 and 142 of heat insulating material, the body portion of the cabinet has inserted crosswise thereof the plate of heat insulating material 202 between the tank 95 and the container 108, and the plate of heat insulating material 203 between the containers 108 and 125.

To operate the refrigerating apparatus the volatile circulating fluid 205, which only congeals or freezes at a very low temperature is charged into the jacket 102 of the cold storage tanks 95, through the fitting 106, and thereby all the jackets of the apparatus are charged with said fluid. While the volatile fluid 205 is being charged into the apparatus the valves 153, 147, 162 and 166 are open. Carbon dioxide 206 known commercially as dry ice, or various other cooling agents are placed in the cold storage tank 95.

The ice cream 121 to be frozen or cooled is placed in the can 120 and other material 210 to be operated upon is placed in the can 143. The operator then adjusts the openings through the valves 147 and 162 as required. The operator also adjusts the openings through the controlling valves 153 and 166, by means of the handles 156 and 169. The amount of opening through each of the latter valves is indicated by their pointers 157 and 170 and their dial plates 51 and 52. The fluid in the jackets of the containers 108 and 125 is raised in temperature by the ice cream or other material in the cans 120 and 143, whereby ebulition begins in the fluid 205 in said jackets. This ebulition causes the lighter portions of the fluid to rise in the cylindrical jackets of the containers 108 and 125. Thereby circulation of the fluid is produced in the piping 146 and 161 in the direction of the arrows in Fig. 6, from the jacket 102 of the cold storage tank 95. The fluid rises in the jackets of the containers 108 and 125 and then flows through the piping 152 and 165 in the direction of the arrows indicated in Fig. 5. From the latter piping the fluid again enters the jacket 102 of the cold storage tank 95, to again have its temperature lowered. By means of the circulation of the volatile fluid, the contents of the cans 120 and 143 are maintained at the proper temperature.

The volume and amount of the volatile fluid circulated is controlled by the operator, by means of the controlling valves 153 and 166. The quantity or volume of the circulating fluid controls the temperature of the ice cream or other material in the cans operated upon.

Attention is called to the fact that the cans 130 and 143 may be dispensed with. The objects operated upon, may be beer, other beverages, meat, fruit and other various materials and may be directly inserted in the cooling containers 108 and 125.

The circulating fluid 205 is such as not to deteriorate or in any way injure the walls of the cold storage tank 95, the cooling containers 108, 125 and the piping connecting the same.

Various modifications may be made in the invention and the present exemplification is to be taken as illustrative and not limitative thereof.

Having described our invention, we claim:

1. In a refrigerating apparatus the combination of a cold storage tank charged with a cooling agent, a jacket surrounding said tank, a cooling container for a material to be cooled in said apparatus, a jacket surrounding the container, piping connecting the lower portions of said jackets, piping connecting the upper portion of said jackets, the jackets and piping adapted for the circulation of a volatile circulating fluid and equalizer piping connecting the upper portions of said jackets.

2. In a refrigerating apparatus the combination of a cold storage tank charged with cooling agent, a jacket surrounding said tank, a cooling container for a material to be cooled in said apparatus, a jacket surrounding the container, circulating piping connecting the lower portions of said jackets, circulating piping connecting the upper portions of said jackets controlling valves in said piping, the jackets and piping adapted for the circulation of a circulating fluid and equalizer piping connecting said jackets above the level of the circulating piping at the upper portions of the jackets.

3. In a refrigerating apparatus the combination of a cold storage tank charged with a cooling agent, a jacket for a circulating fluid surrounding said tank, heat insulating material surrounding said jacket, a cooling container in said apparatus for a material to be cooled, a jacket for the circulating fluid surrounding said container, heat insulating material surrounding the latter jacket, piping connecting the lower portions of said jackets, a controlling valve in said piping, piping connecting the upper portions of said jackets and spaced below the top walls of the jackets to provide expansion chambers for said circulating fluid, a controlling valve in the piping connecting the upper portions of the jackets, means to indicate the amount of opening through the latter valve and equalizer piping connecting said expansion chambers to maintain the circulating fluid at a constant level in said jackets.

4. In a refrigerating apparatus the combination of a cabinet, a main cover for the cabinet, said cover having a plurality of openings, a supplemental cover for each of said openings, a cold storage tank for a cooling agent in the cabinet and axially in line with one of the openings in said main cover, the upper end of the tank normally closed by one of said supplemental covers, a plurality of cooling containers in the cabinet for materials to be operated upon, each of said containers axially in line with one of the openings in said main cover, the upper end of each container normally closed by one of said supplemental covers, means to circulate a volatile fluid from the lower portion of the cold storage tank to the lower portions of said containers, means to circulate said fluid from the upper portions of the containers to the upper portion of said cold storage tank, means to control the amount of said circulation and a thermometer in connection with each container to indicate the temperature thereof.

5. In a refrigerating apparatus the combination of a cold storage tank for a cooling agent, said tank comprising an inner vertical wall having openings in its lower portion, an inner bottom wall and an outer wall forming a lower jacket for said tank, said openings leading into said lower jacket, a jacket surrounding said vertical inner wall, said openings connecting said jackets, a cooling container in said apparatus for a material to be operated upon, said container comprising an inner vertical wall having openings in its lower portion, an inner bottom wall and an outer bottom wall for the container, forming a lower jacket for the container, the openings in the latter vertical wall leading to the latter lower jacket, a jacket surrounding the vertical wall of the container, the openings in the latter lower jacket connecting the jackets of the container and piping adapted to circulate a circulating fluid through all the jackets of the apparatus.

JOHN R. LASSITER, Jr.
CLARA E. QUINN.
JOHN G. LAPHAM.